United States Patent
Bazylenko et al.

(10) Patent No.: US 6,522,799 B1
(45) Date of Patent: Feb. 18, 2003

(54) OPTICAL PLANAR WAVEGUIDE DEVICE AND METHOD OF FABRICATION

(75) Inventors: Michael Bazylenko, Forestville NSW (AU); Mark Sceats, Eveleigh NSW (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/936,684

(22) PCT Filed: Mar. 20, 2000

(86) PCT No.: PCT/AU00/00220

§ 371 (c)(1), (2), (4) Date: Nov. 15, 2001

(87) PCT Pub. No.: WO00/57223

PCT Pub. Date: Sep. 28, 2000

(30) Foreign Application Priority Data

Mar. 18, 1999 (AU) .................................................. 9307

(51) Int. Cl.$^7$ .................................................. G02B 6/12
(52) U.S. Cl. .......................... 385/14; 385/131; 385/130
(58) Field of Search ............................. 385/14, 24, 37, 385/131, 132, 130, 8, 1, 129

(56) References Cited

U.S. PATENT DOCUMENTS

| 4,787,691 A | * 11/1988 | Lorenzo et al. ............. 385/131 |
| 4,997,246 A | * 3/1991 | May et al. ................... 385/131 |
| 5,838,870 A | * 11/1998 | Soref ........................... 385/131 |

* cited by examiner

*Primary Examiner*—Phan T. H. Palmer
(74) *Attorney, Agent, or Firm*—Ladas & Parry

(57) ABSTRACT

A device for processing an optical signal, the device comprising a processing element monolithically integrated with a planar silica-based waveguide structure in which the optical signal propagates.

25 Claims, 1 Drawing Sheet

OPTICAL PLANAR WAVEGUIDE DEVICE AND METHOD OF FABRICATION

FIELD OF THE INVENTION

The present invention relates to a planar optical waveguide device for the processing of optical signals and its construction.

BACKGROUND OF THE INVENTION

The utilisation of optical circuits is becoming increasingly important in the transmission of high bandwidth telecommunication signals. Further, fast switching, wavelength selection and wavelength filtering are rapidly becoming indispensable components of all optical Dense Wavelength Division Multiplexed (DWDM) networks. Such devices tend to be exceedingly complex and expensive to construct.

Another very important optical device at the heart of the DWDM systems is a multi wavelength transmitter. Among available candidates for multi wavelength transmitters, are those based on external cavity silica-based laser modules which offer low chirp and greater wavelength stability and control. Unfortunately, such devices often have minimal modulation capabilities. The desirable inclusion of optical signal modulation functions in such modules would enhance their performance and increase the cost effectiveness of fabrication.

Known carrier injection/absorption effects in semiconductors permit switching/modulation to be performed on the required time scale of nanoseconds or less. Existing devices incorporating semi-conductor functionality are typically epitaxially grown, which involves high growth temperatures, or fabricated in monocrystalline semiconductor substrates. Whilst having high modulation/switching performance such devices are relatively expensive to fabricate, suffer high insertion losses because of the utilisation of the semi-conductor waveguide material, suffer cross talk and are limited in the number of wavelength channels.

Recently, a hybrid solution has been proposed where integrated semiconductor optical amplifier (SOA) gates which perform switching are integrated on a platform with silica-based waveguides used for signal routing and fibre interconnects. Although this solution combines advantages of fast switching in semiconductors with the versatility of silica-based waveguides, it is still not ideal from the point of view of mass manufacturability and cost, since the SOA gates still need to be manufactured on separate chips and then assembled in modules, requiring alignment and wire bonding.

SUMMARY OF THE INVENTION

In accordance with a first aspect of the present invention; there is provided a device for processing an optical signal, the device comprising:
an optical processing element substantially embedded in a silica-based material; and
a planar optical waveguide structure arranged to guide the optical signal, the waveguide structure comprising a silica-based core;
wherein the optical processing element and the planar optical waveguide are monolithically integrated.

The processing element may comprise a first portion and a control means for altering a refractive index of the first portion so as to modify the optical signal. The control means may comprise electrodes arranged to enable charged carriers to be injected into the first portion of the processing element so as to alter the refractive index of the first portion.

The processing element may be arranged to modify an effective refractive index of at least one optical mode of the optical signal in a first region of the waveguide structure.

The processing element may be incorporated in or closely adjacent to the core of the waveguide structure. In one embodiment, the first portion of the processing element effectively forms part of the cladding in the first region of the waveguide. When the refractive index of the first portion of the processing element is changed, the effective refractive index of at least one optical mode of the optical signal is also changed. In this case, the processing element functions as a phase modulator.

The processing element may comprise a semiconductor-based component. The semiconductor-based component can incorporate silicon. The semiconductor-based component may incorporate hydrogenated amorphous silicon. Alternatively, the semiconductor-based component may incorporate polycrystalline silicon.

Alternatively, the processing element may comprise an electro-optic material for modulating the optical signal. The material may have a high $\chi^{(2)}$. In one embodiment, the material comprises barium titanate.

A geometry and spatial relationship of the processing element and the waveguide structure may be chosen such that, in use, optical signal losses associated with optical mode transmission between the processing element and the waveguide structure are reduced.

The optical processing element may alternatively be arranged to convert at least a portion of the optical signal into a corresponding electrical signal. In this case, the processing element may incorporate a semiconductor-based component. The semiconductor-based component may have a bandgap selected to exhibit optical absorption at a wavelength of the optical signal. The semiconductor-based component may incorporate hydrogenated silicon and hydrogenated germanium.

In all of the above-described embodiments, the waveguide structure and the processing element may be monolithically integrated on a substrate comprising electrical circuits for the processing element. The substrate may incorporate a silicon wafer.

In accordance with a second aspect of the present invention, there is provided a method of fabricating any one of the devices described above, wherein hollow cathode chemical vapour deposition is used to form the waveguide structure.

At least a portion of the silica-based waveguide structure may be formed after forming the processing element.

The processing element may comprise a semiconductor component formed by solid phase crystallisation of amorphous silicon. Alternatively, the processing element may comprise hydrogenated amorphous silicon deposited by plasma enhanced chemical vapour deposition (PECVD).

The method may comprise removing a portion of a cladding layer of the waveguide structure in order to monolithically integrate the processing element with the waveguide structure.

BRIEF DESCRIPTION OF DRAWINGS

Notwithstanding any other forms which may fall within the scope of the present invention, preferred forms of the invention will now be described, by way of example only, with reference to the accompanying drawings in which.

DESCRIPTION PREFERRED AND OTHER EMBODIMENTS

In the preferred embodiment, silica-based waveguides (incorporating a silica-based core) and semiconductor carrier injection/absorption elements are integrated monolithically. This results in substantial cost reductions compared to a hybrid integration alternative since batch processing techniques can be utilised throughout the fabrication process.

Figure 1:
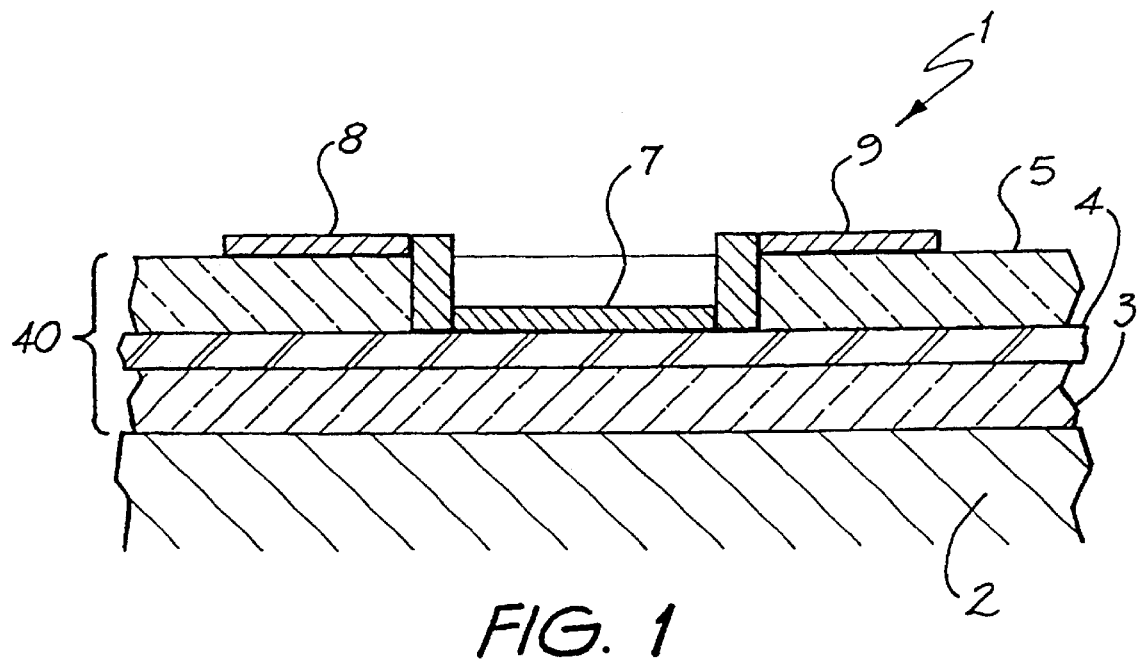
FIG. 1 illustrates a device constructed in the course of the principles of the present invention.

Turning now to FIG. 1, there is illustrated a scheme with a sectional view of an example device 1 which is formed on a substrate 2 and utilises a semiconductor component 7 which, in this embodiment, comprises thin film amorphous silicon, polycrystalline silicon or a silicon/germanium p-i-n structure (i.e. p-type silicon/intrinsic silicon/n-type silicon). It is incorporated into a silica-based channel waveguide structure 40 so that large and fast phase/amplitude modulation of optical signals in the waveguide 4 can be achieved via a free carrier injection/absorption mechanism or in case of silicon-germanium structure to convert an optical signal into an electrical signal.

Through the utilisation of amorphous silicon structures, the speed of operation can be increased due to the intrinsically small carrier life time in amorphous materials. Also, the use of polycrystalline silicon with variable grain size gives an additional tool to find a viable compromise between semiconductor quality (i.e. defect density and recombination rate) to lower the operating current and carrier life times to achieve high speed modulation. Generally with an increase in the grain size the polycrystalline silicon properties move closer towards that of crystalline silicon and vice versa. Overall, this allows for an extremely attractive technique for construction of DWDM modulated sources since the speed of modulation of semiconducted materials is combined with the high functionality and performance of silica-based devices.

It has been recognised that, in one embodiment of the invention, the incorporation of an amorphous semiconductor into a silica-based waveguide can be achieved through the use of a low temperature silica deposition technique. High temperatures would destroy both semiconductor properties of the material and p-i-n carrier injecting structures. One form of suitable deposition technique identified is that outlined in PCT application PCT/AU/96/00563 entitled "A Method and Apparatus for the Construction of Photosensitive waveguides" and in CM Horwitz, S. Boronkay, R. Gross and K. E. Davies, "Hollow Cathode Etching and Deposition" J. Vac. Sci technology AG, at pages 1837 to 1844 (1998) which discloses a low temperature Hollow Cathode-Plasma Enhanced Chemical Vapour Deposition (HS-PECVD) process.

The semiconductor component can be formed as a p-i-n structure in amorphous silicon for example by the method described in S. Guha, X. Xu, J. Yang and A. Banerjee "High deposition rate amorphous silicon-based multijunction solar cell" Appl. Phys. Lett. 66(5), PP 595–597, 1995.

In FIG. 1 there is shown one such constructed device, where light propagating in the core 4 of the silica-based channel waveguide structure 40 interacts with the semiconductor component 7, which is either incorporated in or located sufficiently close to the core 4, so that the effective refractive index of the fundamental optical mode of the waveguide is determined by both the refractive index of silica layers 3, 4, 5 and the refractive index of the semiconductor component 7.

When the refractive index of the semiconductor is changed by carrier injection by applying an electrical signal to the electrodes 8, 9, the effective refractive index of the fundamental mode propagating in silica-based waveguide in vicinity of the semiconductor is also changed accordingly. This can be utilized for very fast (on the time scale of minority carrier lifetime in the semiconductor) modulation or switching e.g. by using the induced phase shift in a Mach-Zehnder configuration.

Figure 2:
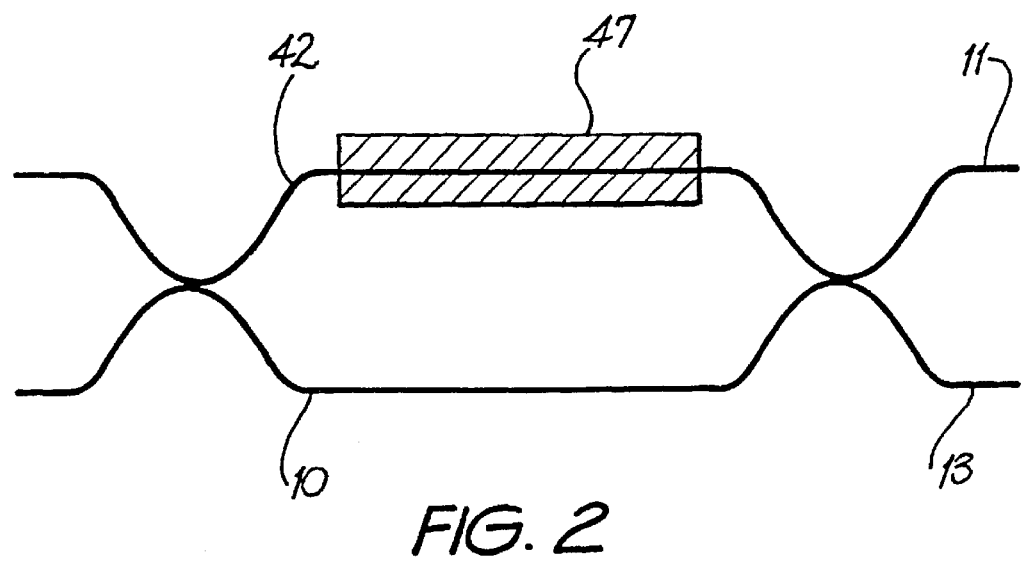
FIG. 2 illustrates the process of incorporation of the device FIG. 1 in a Mach-Zehnder arrangement.

FIG. 2 illustrates an example Mach-Zehnder arrangement wherein a semiconductor layer 47 is formed over a core 42 of one arm of the two arm Mach-Zehnder in the system. By using the semiconductor 47, the refractive index of part of arm 42 is modulated relative to the arm 10 so as to produce a phase shift which in turn results in an intensity modulation between the output arms 11, 13.

Further, alternative applications for utilising the change in the effective refractive index of the fundamental mode can be undertaken. For example, the change in refractive index can be utilised to alter the peak spectral position of a Bragg grating formed in the region of a silica based waveguide where mode refractive index changes are induced by the presence of a semiconductor layer. The shifting of the peak spectral position can in turn provide for the large modulation of a signal or selection between different wavelengths.

In yet another application the refractive index changes induced by the semiconductor in the multimode region of a multimode interference (MMI) device or waveguide array gratings (WAG), can be used for fast wavelength switching between different output ports.

In addition to the carrier injection effect in semiconductors which provides fast changes in refractive index, free carrier absorption effects can also be used for optical signal modulation or attenuation. In this case the driving electric signal determines the intensity (not phase as in carrier injection) of light at the output of the semiconductor interaction region.

In practical realisation of such devices the issues of adiabatic transition between pure silica and silica/semiconductor region of the channel waveguide are preferably manipulated in order to minimise the loss associated with this transition.

In practice, the most suitable type of modulation (carrier injection or absorption) should be experimentally determined for amorphous silicon material produced with e.g. Ultra-High-Vacuum PECVD machine. Carrier injection, as opposed to carrier absorption, has smaller power requirements but at the same time can be off-set by simultaneous thermo-optic effect (which drives refractive index in the opposite direction) unless an adequate heat sink is provided and/or operating current is kept low.

In an alternative embodiment of the present invention, the semiconductor component can be used to convert an optical signal into an electrical signal thus performing a detector function. For that purpose the semiconductor component is designed and fabricated in such a way that it exhibits absorption at the optical signal wavelength.

The necessary absorption (determined by the semiconductor junction band gap) can be tailored by varying the composition of the semiconductor material. For example, a p-i-n structure based on pure amorphous silicon has little absorption at the 1.5 micron telecommunication wavelength, but codoping with Ge can reduce the band gap and provide the necessary photosensitivity in the infrared.

Practical issues of such an integrated photodetector which should be addressed are its size and back reflections. The size can determine the detector capacitance, which in turn determines the maximum achievable bandwidth. High light conversion efficiency will be required to minimise the semiconductor component size (thus increasing bandwidth). The effect of back reflections can be minimised by either using a dielectric (eg. silicon nitride) antireflection coating or by angling the waveguide end face on which the semiconductor component is formed.

The semiconductor component for the detector application can be fabricated, for example, by the method described in Hwang S B, Fang Y K, Chen K H, Liu C R, Hwang J D, Chou M H "An a-SiH/a-Si, Ge:H bulk barrier phototransistor with a-SiC:H barrier enhancement layer for high-gain IR optical detector" IEEE Transactions on Electron Devices, 40(4), pp721–726, 1993.

Combined with the integrated transmitter modules based on the use of semiconductor component as a modulator, the additional detector function of the semiconductor component can provide for an important synergistic effect. This can allow the fabrication of low cost transceiver modules for optical local access networks.

In another preferred embodiment a silicon substrate is used for a device structure and driver circuits for modulator or amplifier circuits for a detector are fabricated in the silicon substrate prior to the fabrication of integrated silica-based and semiconductor components. This allows for additional cost savings via increase of functionality of each single chip, mass-manufactured by the batch IC techniques. Again, it has been recognised that low temperature techniques for fabrication of the silica based planar waveguide components allows for the implementation of such an embodiment of the present invention.

In another embodiment, the processing element may incorporate electro-optic materials to modulate an optical signal propagating in a silica-based waveguide. Materials having a high $\chi^{(2)}$ (e.g. barium titanate).

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, other deposition techniques may be used to form the silica-based waveguide, such as sol-gel deposition techniques.

We claim:

1. A device for processing an optical signal, the device comprising:
    an optical processing element substantially embedded in a silica-based material; and
    a planar optical waveguide structure arranged to guide the optical signal, the waveguide structure comprising a silica-based core;
wherein the optical processing element and the planar optical waveguide are monolithically integrated.

2. A device as claimed in claim 1, wherein the processing element comprises a semiconductor-based component.

3. A device as claimed in claim 2, wherein the semiconductor-based component incorporates polycrystalline silicon.

4. A device as claimed in claim 3, wherein a grain size of the polycrystalline silicon is selected to control carrier life times in the polycrystalline silicon so as to achieve a predetermined modulation frequency of the optical signal.

5. A device as claimed in claim 2, wherein the semiconductor-based component incorporates silicon.

6. A device as claimed in claim 2, wherein the semiconductor-based component incorporates hydrogenated amorphous silicon.

7. A device as claimed in claim 1, wherein the optical processing element is arranged to convert at least a portion of the optical signal into a corresponding electrical signal.

8. A device as claimed in claim 7, wherein the processing element incorporates a semiconductor-based component.

9. A device as claimed in claim 8, wherein the semiconductor-based component has a bandgap selected to exhibit optical absorption at the wavelength of the optical signal.

10. A device as claimed in claim 7, wherein the semiconductor-based component incorporates hydrogenated silicon and hydrogenated germanium.

11. A method of fabricating a device in accordance with claim 1, wherein the waveguide structure is deposited by hollow cathode plasma enhanced chemical vapour deposition (PECVD).

12. A method as claimed in claim 11, wherein at least a portion of the waveguide structure is formed after forming the processing element.

13. A method as claimed in claim 11, wherein the processing element comprises a semiconductor component formed by solid phase crystallisation of amorphous silicon.

14. A method as claimed in claim 11, wherein the processing element comprises hydrogenated amorphous silicon deposited by PECVD.

15. A method as claimed in claim 11, the method further comprising a step of removing a portion of a cladding layer of the waveguide structure in order to monolithically integrate the processing element with the waveguide structure.

16. A device as claimed in claim 1, wherein the processing element comprises a first portion and a control means for altering a refractive index of the first portion so as to modify the optical signal.

17. A device as claimed in claim 16, wherein the control means comprises electrodes arranged to enable charge carriers to be injected into the first portion of the processing element so as to alter the refractrive index of the first portion.

18. A device as claimed in claim 16, wherein the first portion of the processing element is incorporated in or closely adjacent to the silica-based core.

19. A device as claimed in claim 1, wherein the processing element comprises an electro-optic material for phase-modulating the optical signal.

20. A device as claimed in claim 19, wherein the electro-optic material has a high $X^{(2)}$.

21. A device as claimed in claim 20, wherein the material comprises barium titanate.

22. A device as claimed in claim 1, wherein the processing element is arranged to modify an effective refractive index of at least one optical mode of the optical signal in a first region of the waveguide structure.

23. A device as claimed in claim 22, wherein a geometry and spatial relationship of the processing element and the waveguide structure are such that there is a substantially adiabatic transition between the first region of the waveguide and other regions of the waveguide so as to minimize optical signal losses.

24. A device as claimed in claim 1, wherein the waveguide structure and the processing element are monolithically integrated on a substrate comprising electrical circuits for the processing element.

25. A device as claimed in claim 24, wherein the substrate incorporates a silicon wafer.

* * * * *